United States Patent [19]

Padberg et al.

[11] Patent Number: 4,997,579

[45] Date of Patent: Mar. 5, 1991

[54] PROCEDURE FOR THE DRAINING OF SLUDGE

[75] Inventors: Werner Padberg, Dudweiler; Norbert Gros, Neunkirchen; Werner Stahl, Landau, all of Fed. Rep. of Germany

[73] Assignee: Saarbergwerke Aktiengesellschaft, Saarbrucken, Fed. Rep. of Germany

[21] Appl. No.: 473,952

[22] PCT Filed: Jun. 28, 1989

[86] PCT No.: PCT/DE89/00428

§ 371 Date: Feb. 13, 1990

§ 102(e) Date: Feb. 13, 1990

[87] PCT Pub. No.: WO90/00080

PCT Pub. Date: Jan. 11, 1990

[30] Foreign Application Priority Data

Jun. 30, 1988 [DE] Fed. Rep. of Germany ....... 3822010

[51] Int. Cl.$^5$ .................. C02F 11/12; B01D 21/24; B01D 33/052
[52] U.S. Cl. .................. 210/803; 210/386; 210/400; 210/526; 210/805
[58] Field of Search ............... 210/783, 803, 526, 805, 210/400, 401, 386, 396

[56] References Cited

U.S. PATENT DOCUMENTS

| | | | |
|---|---|---|---|
| 3,630,358 | 12/1971 | Ralph | 210/783 |
| 3,891,549 | 6/1975 | Carmel et al. | 210/400 |
| 4,192,747 | 3/1980 | Wykoff | 210/526 |
| 4,858,769 | 8/1989 | DeVries | 210/526 |

FOREIGN PATENT DOCUMENTS

| | | | |
|---|---|---|---|
| 743917 | 11/1943 | Fed. Rep. of Germany . | |
| 2043479A | 10/1980 | United Kingdom | 210/400 |

Primary Examiner—Richard V. Fisher
Assistant Examiner—Neil M. McCarthy
Attorney, Agent, or Firm—James Creighton Wray

[57] ABSTRACT

Procedure for draining of sludge, especially flocculent flotation sludge, including introducing water-sludge mixture into a settling tank with an overflow and removing the settled sludge layer from the settling tank with a slanted conveyor. Horizontal grooves are then pressed in the sludge layer by section roller rows arranged over the slanted conveyor belt. The water extracted from the sludge layer is collected and canalized in these horizontal grooves. The back-flowing water is then collected and guided off in water drainage systems arranged over the slanted conveyor. These water drainage systems are tilted toward and enter a front side of the horizontal grooves. This collected water may either be eliminated directly or returned to the settling tank.

9 Claims, 1 Drawing Sheet

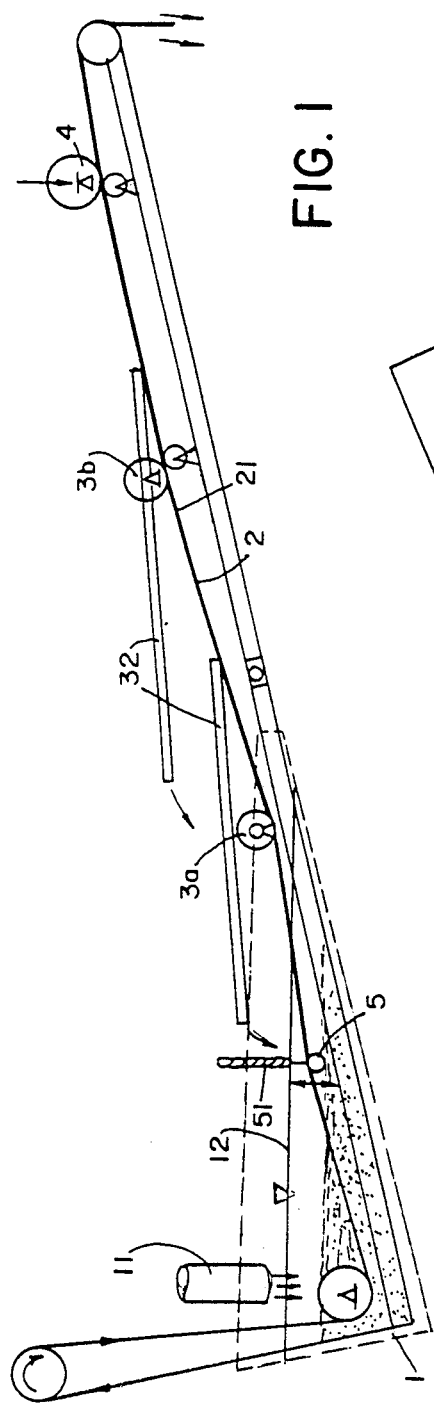
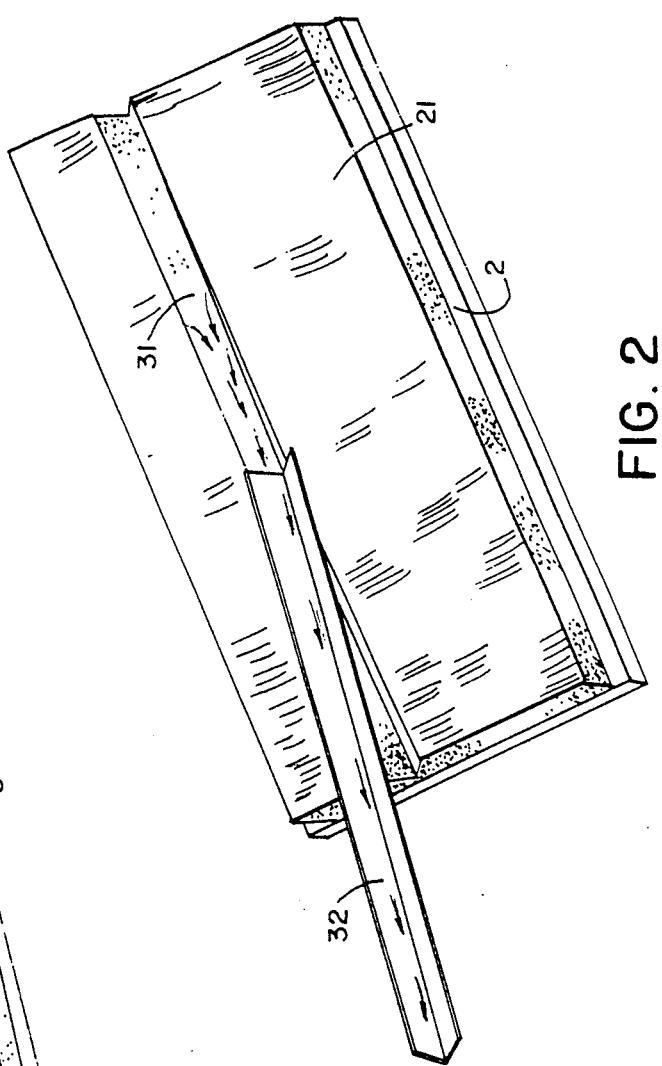
FIG. 1
FIG. 2

PROCEDURE FOR THE DRAINING OF SLUDGE

BACKGROUND OF THE INVENTION

1. Field of the Invention

The invention concerns a procedure for the draining of sludge, especially of Flocculent flotation sludge, whereby the water-mud cloudiness is introduced into a settling tank with a water overflow.

2. Prior Art

With the use of increasingly productive output machinery in the coal mining industry, the fine and finest granular portion of the raw coal has inevitably increased.

The separation of fine-granular portion of the raw coal is widely effected by flotation. The sludge recovered during the flotation process must be drained to the point that it can be eliminated, i.e, deposited.

The mechanical drainage of the recovered sludge, for example, by swivel filter presses, is connected with high investments and high operating costs.

Therefore, in most cases, the flotation sludge is first thickened by chemical flocculation compounds and the resulting pre-drained sludge is deposited in sink ponds. These ponds provide ample time for the sludge to settle, so that mud-free water flows from the overflow. When the usable space of the sinking pond is filled with mud, a new sinking pond must be constructed.

An essential disadvantage of this procedure is the large area required for the construction of sinking ponds, whereby suitable areas are not always available as needed.

It is, therefore, the task of the presented invention to provide for a simple and economic process for the draining of sludge, especially flocculent flotation sludge, so that it can subsequently be deposited in high containers.

SUMMARY OF THE INVENTION

Based on the invention stated at the beginning, this task is solved in that the sediment sludge constantly removed from the settling tank is transferred onto a slanted conveyer, that horizontal grooves for the canalization of the water extracted from the sludge are molded into the sludge layer on the slanted conveyor, and that the water flowing back in the horizontal grooves is accepted and removed by water drainage systems arranged over the slanted conveyor and tilted towards the front side of the horizontal grooves.

This results, appropriately, in the syphoning and draining of the back-flowing water over several rows of water channels arranged successively in conveyor direction.

The horizontal grooves molded into the sludge layer on the slanted conveyor effect, on the one hand, short draining passages diagonally to the conveyor direction, and on the other hand, they drain the released back-flowing water. This water can be removed and, if necessary, immediately returned to the settling tank on several successive levels in conveyor direction. Because of the short flow passages of the water extracted from the sludge a relief on the sludge layer on the following conveyor area and a good drainage of the sludge is achieved.

The invented procedure effects, in an especially simple manner, the reduction of the water contents in refined sludge to the point that, if necessary, by introducing a dry medium as, for example, flue ash, it can also be stored in high depositories.

To improve the drainage, the sludge can be shifted between the groove rows, whereby the newly formed horizontal grooves may present a distance different from the other conveyor sections. It could also be practical to plan, in addition, a pressure drainage by means of several pressure rollers.

The forming of the horizontal grooves can immediately be effected by pressing into the water lines on the sludge layer or, on the other hand, by another suitable device. Appropriately, however, the horizontal grooves are pressed in by profile rollers distributed across the width of the slanted conveyor, for example, section rollers of a roller diagonally provided for over the slanted conveyor. If the section rollers are not operated by the sludge layer itself, but, for example, by conveyor rollers constructed on the side of the conveyor, a supportive effect for the pressing in is achieved by means of the forced relative speed between the sludge layer and the roller surface. To achieve a better drainage of the water eliminated from the sludge into the prepared horizontal grooves, the surfaces of the section rollers in the edge areas could be supplied with a diagonal profile. For the continued removal of the sludge in the settling tank, the well-known devices like bucket conveyors or suitable floodgates can be used. In the treatment of flocculent sludge, especially during the phase of the cake formation and removal, it is essential that the formed agglomerates are not destroyed by shearing stress.

An especially protective discharge of the sludge is achieved if the slanted conveyor reaches up to the settling tank, so that the sludge can be removed and immediately be discharge on the conveyor.

Thereby it is advantageous to change the pass-through angle of the slanted conveyor loaded with the sludge through the cloudy surface, for example by means of a roller arranged under the slanted conveyor, that is height-adjustable, whereby it will be adjusted to the consistency of the sludge to avoid, in this critical area, a tearing off and back-flowing of the sludge masses.

These and further and other objects and features of the invention are apparent in the disclosure, which includes the above and ongoing written specification, including the claims and the drawings.

BRIEF DESCRIPTION OF THE DRAWINGS

FIG. 1 The schematic presentation of a device for the execution of the invented procedure.

FIG. 2 An example of the connection of a water channel to a horizontal groove of the sludge layer.

DETAILED DESCRIPTION OF THE INVENTION

As shown in FIG. 1 the sludge enters by means of a water sludge clouding device 11 above cloudy surface 12 into a settling tank 1. An example of this sludge is flocculent residue sludge from coal preparation. The sludge settles on a slanted conveyor 2, led through settling tank 1, and is continuously removed from the settling tank 1. The removal of the sludge-free water from the settling tank is effected over an overflow (not shown).

As shown in FIG. 2, as the sludge layer 21 is removed through by the slanted conveyor 2, horizontal grooves 31 are pressed into the sludge layer 21 by means of section roller rows 3a, b, arranged over the slanted conveyor belt 2, whereby the first section roller row 3a is appropriately arranged immediately above or just below the cloudy surface 12.

The water extracted from the sludge layer 21 is collected and canalized in these horizontal grooves 31. The water flowing back in the horizontal grooves 31 is, after only a short flow path, caught by the water lines 32 that enter into the horizontal grooves 31, and is eliminated either directly or returned to the settling tank. The number of section roller rows 3a, b, as well as the water channel rows 32 can, of course, be increased depending on the existing conditions.

Appropriately, various distances between the section rollers within a row, and thereby different distances of the pressed in horizontal grooves 31, are selected for the individual section roller rows 3a, b. At the same time, a reshuffling and pressing of sludge layer 21, advantageous for the sludge drainage, is effected through this change. However, a reshuffling can objectively be achieved through additional devices between the individual section roller rows 3a, b. An additional pressure drainage is effected through a pressure roller 4, whereby this pressure drainage can, of course, be used repeatedly, as, for example, also between the individual section roller rows. In FIG. 1 a roller 5 is arranged in an area below the cloudy surface 12 which grips under the upper belt of the slanted conveyor belt 2. The height of the roller can be adjusted by a control device 51 or a spindle switch, respectively. Thus, the elevation angle of the slanted conveyor belt 2 can be adjusted to the existing conditions of sludge consistency and sludge adhesion on the conveyor belt in the critical area of the flow through the cloudy surface 12, to prevent the tearing of the sludge layer.

While the invention has been described with reference to specific embodiments, modifications and variations of the invention may be constructed without departing from the scope of the invention, which is described in the following claims.

We claim:

1. A procedure for the draining of sludge comprising the steps of:
   introducing water-sludge mixture into a settling tank with a water overflow;
   continuously removing settled sludge layer from the settling tank with a slanted conveyor;
   forming horizontal grooves in the sludge layer on a belt of the slanted conveyor for the canalization and back-flowing of water extracted from the sludge layer; and
   collecting and guiding off said back-flowing water in water drainage systems arranged over the slanted conveyor, wherein the water drainage systems are tilted toward and enter a front side of the horizontal grooves.

2. Procedure according to claim 1, wherein the collecting and guiding-off of the back-flowing water is effected by several rows of water channels arranged successively in the conveyor direction.

3. Procedure according to claim 2, wherein a groove distance between the water channels can be altered.

4. Procedure of claim 1, wherein the forming of the horizontal grooves is effected by section rollers arranged over a width of the slanted conveyor belt.

5. Procedure of claim 1, wherein a pressure drainage takes place between the water channels.

6. Procedure according to claim 1, wherein the settled sludge is immediately removed from the settling tank by way of the slanted conveyor.

7. Procedure according to claim 6 wherein a passage angle of the slanted conveyor into said settling tank is variable.

8. The procedure according to claim 2, wherein a groove distance between the water channels can be altered and the sludge reshuffled.

9. The procedure according to claim 2, wherein the sludge is reshuffled.

* * * * *